(12) United States Patent
Fox et al.

(10) Patent No.: US 9,319,972 B2
(45) Date of Patent: *Apr. 19, 2016

(54) LOCATION BASED SERVICES IN COMMUNICATIONS NETWORKS

(75) Inventors: David Andrew Fox, Reading (GB); Gavin Wong, Surrey (GB); Christopher David Pudney, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 11/180,220

(22) Filed: Jul. 13, 2005

(65) Prior Publication Data

US 2006/0035646 A1 Feb. 16, 2006

(30) Foreign Application Priority Data

Jul. 14, 2004 (GB) .................................. 0415756.6

(51) Int. Cl.
| | | |
|---|---|---|
| H04M 11/00 | (2006.01) | |
| H04W 48/18 | (2009.01) | |
| H04W 4/02 | (2009.01) | |
| H04W 64/00 | (2009.01) | |
| H04W 84/04 | (2009.01) | |

(52) U.S. Cl.
CPC ................ *H04W 48/18* (2013.01); *H04W 4/02* (2013.01); *H04W 64/00* (2013.01); *H04W 84/042* (2013.01)

(58) Field of Classification Search
CPC ....... H04W 48/18; H04W 4/02; H04W 64/00; H04W 84/042

USPC .......... 455/404.2, 456.1, 456.2, 456.3, 456.4, 455/456.5, 456.6, 457, 435.2, 436
See application file for complete search history.

(56) References Cited

U.S. PATENT DOCUMENTS

| | | | |
|---|---|---|---|
| 6,603,977 B1 * | 8/2003 | Walsh et al. ................ | 455/456.1 |
| 6,741,693 B1 | 5/2004 | Madoch et al. | |
| 6,766,173 B1 * | 7/2004 | Chun et al. ..................... | 455/450 |
| 6,785,535 B2 * | 8/2004 | Lucidarme et al. ........... | 455/406 |
| 7,127,250 B2 * | 10/2006 | Gallagher et al. ............ | 455/436 |
| 2001/0055976 A1 | 12/2001 | Crouch | |

(Continued)

FOREIGN PATENT DOCUMENTS

| | | |
|---|---|---|
| EP | 1 301 052 A3 | 4/2003 |
| GB | 2 367 213 A | 3/2002 |

(Continued)

OTHER PUBLICATIONS

Jonathan Agre et al. "Layered Architecture for Location-Based Services in Wireless Ad Hoc Networks". Aerospace Conference Proceedings, 2002. IEEE Mar. 9-16, 2002 Piscataway, NJ, USA, IEEE vol. 3, Mar. 9, 2002, pp. 1085-1097.

*Primary Examiner* — Wayne Cai
(74) *Attorney, Agent, or Firm* — Workman Nydegger

(57) ABSTRACT

This disclosure concerns systems and methods for implementing location based services in communications networks. In one example, when the GMLC of a telecommunications network receives a request for the location of a mobile terminal, an SMLC is interrogated to obtain therefrom, if available, data indicative of the location of the relevant mobile terminal. The mobile terminal may be caused to selectively switch between a GSM radio access network and another access network if no location information is derivable from one of the access networks currently used by the device.

40 Claims, 5 Drawing Sheets

(56) References Cited

U.S. PATENT DOCUMENTS

| | | |
|---|---|---|
| 2002/0065086 A1 | 5/2002 | Vanttinen |
| 2002/0098832 A1* | 7/2002 | Fleischer et al. ............... 455/414 |
| 2002/0107029 A1* | 8/2002 | Caughran et al. ............. 455/456 |
| 2002/0176407 A1 | 11/2002 | Vimpari |
| 2003/0050076 A1 | 3/2003 | Watanabe |
| 2004/0058692 A1 | 3/2004 | Kall et al. |
| 2004/0127160 A1* | 7/2004 | Moilanen ................... 455/67.11 |
| 2005/0170852 A1* | 8/2005 | Li et al. ..................... 455/456.5 |

FOREIGN PATENT DOCUMENTS

| | | |
|---|---|---|
| GB | 2 376 845 A | 12/2002 |
| GB | 2 387 069 A | 10/2003 |
| WO | WO 03/032618 A1 | 4/2003 |
| WO | WO 03/032656 A1 | 4/2003 |
| WO | WO 03/081939 | 10/2003 |
| WO | WO 03/096628 A1 | 11/2003 |
| WO | WO 03/098959 A1 | 11/2003 |
| WO | WO 2004/002051 A3 | 12/2003 |

* cited by examiner

LOCATION BASED SERVICES IN
COMMUNICATIONS NETWORKS

CROSS-REFERENCE TO RELATED APPLICATIONS

This Application claims the benefit of United Kingdom Patent Application No: GB 0415756.6 entitled LOCATION BASED SERVICES IN COMMUNICATIONS NETWORKS, filed Jul. 14, 2004, which is incorporated herein in its entirety by this reference.

BACKGROUND OF THE INVENTION

The Field of the Invention

The present invention relates to providing location based services in communications networks.

BRIEF SUMMARY OF EXEMPLARY EMBODIMENTS OF THE INVENTION

According to a first aspect of the invention, there is provided a GSM or the like cellular telecommunications network including a radio access network and a core network for providing GSM or the like functions to devices registered therewith over a GSM or the like bearer, the radio access network comprising a plurality of geographically distributed cells, and the cellular telecommunications network being adapted to provide core network GSM or the like functions to devices registered therewith over a non-GSM bearer via another access network; wherein the cellular telecommunications network includes means for receiving a request for the location of a device, means for interrogating a location data processor to obtain, if available, data indicative of the location of said device, and means for causing the device to switch between the respective access networks if said location indicative data is not available when the device uses one of those access networks.

According to a second aspect of the invention, there is provided a method of operating a GSM or the like cellular telecommunications network including a radio access network and a core network for providing GSM or the like functions to devices registered therewith over a GSM or the like bearer, the radio access network comprising a plurality of geographically distributed cells, and the cellular telecommunications network being adapted to provide core network GSM or the like functions to devices registered therewith over a non-GSM bearer via another access network, the method including receiving a request for the location of one of said devices, interrogating a location data processor to obtain, if available, data indicative of the location of said device, and selectively causing the device to switch between the respective access networks if said location indicative data is not available when the device is coupled to one of those access networks.

These and other aspects of exemplary embodiments of the present invention will become more fully apparent from the following description and appended claims.

BRIEF DESCRIPTION OF THE DRAWINGS

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope The invention will be described and explained with additional specificity and detail through the use of the accompanying drawings in which.

DETAILED DESCRIPTION OF EXEMPLARY EMBODIMENTS

Figure 1:
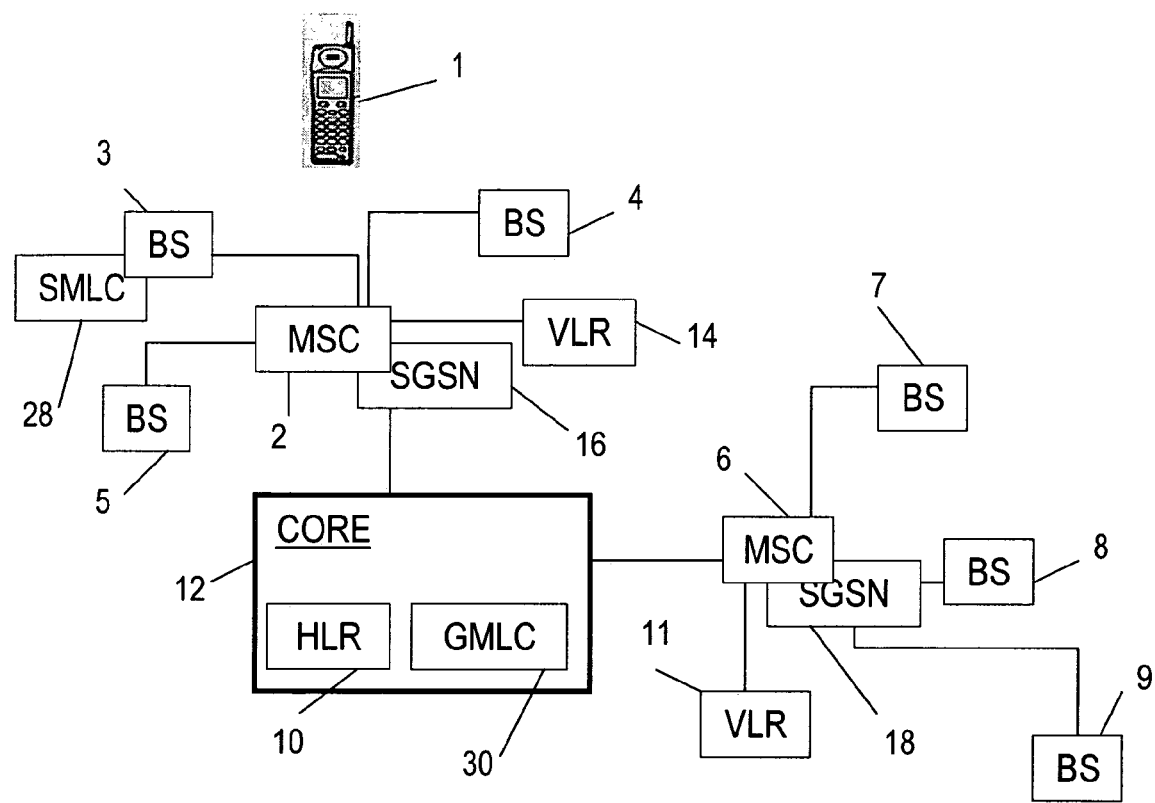
FIG. 1 is a diagrammatic drawing of elements of a GSM mobile telephone network for use in explaining the operation of such a network.

In the drawings like elements are generally designated with the same reference numeral.

Various elements of a mobile telecommunications network, and its operation, will now briefly be described with reference to FIG. 1.

Each base station (BS) corresponds to a respective cell of its telecommunications network and receives calls from and transmits calls to a mobile terminal in that cell by wireless radio communication. Such a subscriber's mobile terminal or mobile station (MS) is shown at 1. Each base station comprises a base transceiver station (BTS) and a base station controller (BSC). A BSC may control more than one BTS. The BTSs and BSCs comprise the radio access network.

The base stations are arranged in groups and each group of base stations is controlled by a mobile switching centre (MSC), such as MSC 2 for base stations 3, 4 and 5. As shown in FIG. 1, the network has another MSC 6, which is controlling a further three base stations 7, 8 and 9. In practice, the network will incorporate many more MSCs and base stations than shown in FIG. 1.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not known to the subscriber. The subscriber is issued with a publicly known number, that is, the subscriber's telephone number, by means of which calls to the subscriber are initiated by callers. This number is the MSISDN.

The network includes a home location register (HLR) 10 which, for each subscriber to the network, stores the IMSI and the corresponding MSISDN together with other subscriber data, such as the current or last known location of the subscriber's mobile terminal.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) to the base station 3 associated with the particular cell in which the terminal 1 is located. The base station 3 then transmits this IMSI to the MSC 2 with which the BS 3 is registered.

MSC 2 now accesses the appropriate location in the HLR 10 present in the network core 12 and extracts the corresponding subscriber MSISDN and other subscriber data from the appropriate storage location, and stores it temporarily in a location in a visitor location register (VLR) 14. In this way, therefore the particular subscriber is effectively registered with a particular MSC (MSC 2), and the subscriber's information is temporarily stored in the VLR (VLR 14) associated with that MSC.

When the HLR 10 is interrogated by the MSC 2 in the manner described above, the HLR 10 additionally performs an authentication procedure for the mobile terminal 1. The HLR 10 transmits authentication data to the MSC 2 in "challenge" and "response" forms. Using this data, MSC 2 passes a "challenge" to the mobile terminal 1 through base station 3. Upon receipt of this data, the mobile terminal 1 passes this data to its SIM and produces a "response". This response is generated using an encryption algorithm on the SIM and a unique Ki on the SIM. The response is transmitted back to the MSC 2 which checks it against its own information for the subscriber which checks it against information that it has obtained for that subscriber from the HLR 10 in order to complete the authentication process. If the response from the mobile terminal 1 is as expected, the mobile terminal 1 is deemed authenticated. At this point the MSC 2 requests subscription data from the HLR 10. The HLR 10 then passes the subscription data to the VLR 14.

The authentication process will be repeated at regular intervals while the mobile terminal 1 remains activated and can also be repeated each time the mobile terminal makes or receives a call, if required.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, having already inserted the SIM card into the reader associated with this mobile terminal and the SIM has been authenticated in the manner described, a call may be made by entering the telephone number of the called party in the usual way. This information is received by the base station 3 and is then routed to the called party via the MSC 2. By means of the information held in the VLR 14, MSC 6 can associate the call with a particular subscriber and thus record information for charging purposes.

The MSCs 2 and 6 support communications in the circuit switched domain—typically voice calls. Corresponding serving gateway support nodes (SGSNs) 16 and 18 are provided to support communications in the packet switched domain—such as GPRS data transmissions.

GSM offers multiple "services" to end users. In the GSM Specifications, services are grouped in 3 categories.

1. Bearer Services: A bearer service is used for transporting user data. Examples of bearer services are:
    Asynchronous and synchronous data, 300-9600 bps.
    Alternate speech and data, 300-9600 bps.
    Asynchronous PAD (packet-switched, packet assembler/disassembler) access, 300-9600 bps.
    Synchronous dedicated packet data access, 2400-9600 bps.
2. Tele-Services: These include both speech and data services. Examples of tele-services are:
    Telephony.
    Facsimile group 3.
    Emergency calls.
    Teletex.
    Short Message Services.
    Fax mail.
    Voice mail.

3. Supplementary Services: These are offered as improvements to the above tele-services. They enable the user to have better control of the basic services. Examples of supplementary services are:
    Call Forwarding.
    Call Barring.
    Call hold. Puts an active call on hold.
    Call Waiting.
    Advice of Charge.
    Multiparty service.
    Calling Line Identification.

The foregoing is intended to be merely a simplified description of the normal operation of the GSM network. In practice, other procedures will be carried out.

There have recently been proposals to allow access to the features and services provided by GSM networks other than by accessing those networks in the conventional manner by wireless signaling between the mobile terminal and the base station providing coverage in the cell occupied by the mobile terminal using GSM communication protocols. It has been proposed to provide network access points (APs), for example at a subscriber's home. A modified GSM terminal is provided with the facility to additionally communicate with the access point by any suitable technology, for example by a link, such as a Bluetooth (RTM) connection or WLAN connection. A protocol for communication between such a mobile terminal and an access point has been developed and is called "unlicensed mobile access" (UMA), and allows GSM features to function using non-GSM bearer technologies.

Figure 2:
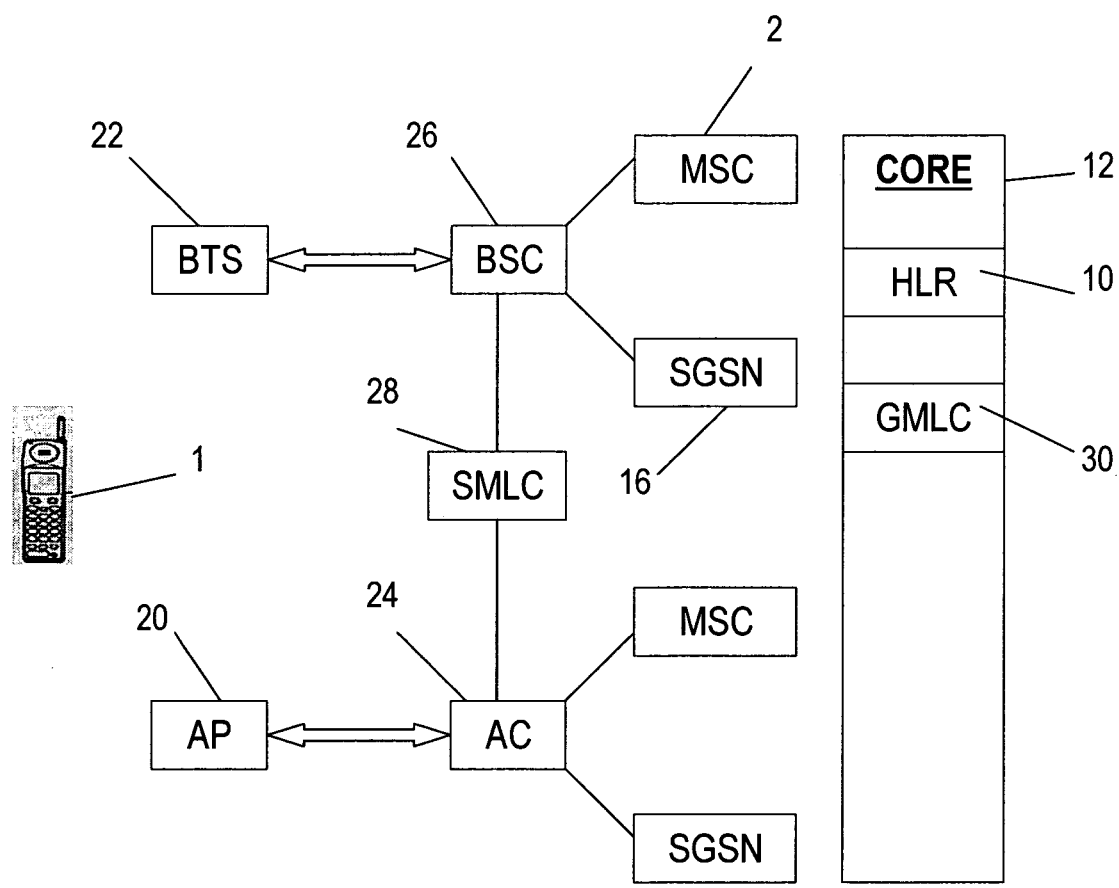
FIG. 2 shows a modified GSM mobile telephone network for receiving IP-based communications from a non-GSM access point.

FIG. 2 shows elements for providing access to a GSM network by both a conventional GSM bearer and a non-GSM bearer. As indicated above, an AP 20 provides a radio link to mobile terminal 1, although a link by a cable or other means such an infra-red is also possible. The AP 20 performs a role corresponding to that of a GSM base station transceiver (BTS) 22.

An access controller (AC) 24 is provided which performs a function analogous to that of a GSM BSC 26. Communications between the access point 20 and the access controller 24 are IP based communications, and may be, for example, transmitted over a broadband IP network (and routed via the Internet). The access controller converts the IP based signaling received from the access point to use protocols used for signaling in conventional GSM networks between the base station controller 26 and MSC 2/SGSN 16. When the mobile terminal 1 connects to the AP 20, it will be provided with an IP address for use during the communication session, and the AP 20 will inform the mobile terminal of its own IP address.

At this point it should be appreciated that mobile telecommunications networks, with their geographically distributed BTSs, BSCs, MSCs and SGSNs, have been developed to allow subscribers to make and receive calls at any point, and whilst moving around, within the network coverage area. The complex location signaling between the mobile terminal and the components of the network is provided to enable this operation throughout the coverage area of the network. The considerations for fixed IP based communications are very different. Data received from the mobile terminal at the access point 20 is transmitted via any IP network (such as the Internet). Only a single access controller 24 is required to receive IP based communications from all access points 20. For example, a single access controller may be provided for communications in one country.

As indicated above, the functions of the BSC 26 and access controller 24 are analogous: both components translate communications into a format suitable for transmission to an MSC/SGSN. However, each BSC 26 is associated with a particular MSC 2 and SGSN 16 (and is located within a particular location area). In contrast, there is no particular predetermined relationship between the access controller 24 and any particular MSC/SGSN.

It is desirable for the mobile telecommunications network to be able to determine the location of a mobile terminal that is communicating therewith via the conventional BTS 22/BSC 26 route, or via the AP 20/AC 24 route, so that location-based services (LBS) can be provided.

When a mobile terminal is registered with the GSM network, the mobile terminal passes to the BSC 26 (via the BTS 22) the Cell Global Identity (CGI) of the cell used in the GSM network. The current CGI of the device is stored by the network core 12. The CGI is a concatenation of the location area (LA) and the cell identity and uniquely identifies a given cell. The mobile terminal may also store the CGI on its SIM. The cell occupied by a mobile terminal is typically 10 km in diameter, and therefore knowledge of the cell occupied by a mobile terminal is insufficient to provide satisfactory location based services. Various known methods of more accurately determining the location of a mobile terminal within a mobile telecommunications network have been developed—for example Timing Advance, Signal Strength (RX Measurement/Network Measurement Results), Angle of Arrival, Time Difference of Arrival, GPS and Assisted-GPS). These will be known to those skilled in the art and will not be described further here.

To enable determination of the location of a mobile terminal the GSM telecommunications network is provided with a plurality of Serving Mobile Location Centers (SMLCs) 28, each of which is associated with a respective base station or BSC, (and only one of which is shown in FIGS. 1 and 2 for the sake of clarity). Also provided is a Gateway Mobile Location Centre (GMLC) 30 associated with the network core 12. Between them these elements maintain a detailed database of network information, including the geographic location of each of the network base stations and relevant cell sector size and coverage data. This data is used to determine the geographical location of a mobile terminal.

The SMLC coordinates the network resources necessary to perform positioning calculations. Whenever the application wishes to know the location of a mobile terminal a request is made to the SMLC, and procedures are initiated in order to determine the geographical location of the relevant mobile terminal. This geographical location information is then provided to the GMLC in the network core 12. It should be noted that the SMLC is one example of a structural implementation of a means for receiving a request for the location of a device, however, any other systems and/or devices of comparable functionality may also be employed.

In the above description (and in the GSM Specifications) it is stated that each BSC should be accompanied by an SMLC. However, it is possible to employ fewer SMLCs and provide the same functionality.

The GMLC acts as a gateway between the network core 12 and other non-network elements, such as the Public Switched Telephone Network (PSTN), other cellular networks and applications providing services to subscribers. The GMLC receives the location data from the SMLCs and routes this to the relevant destination. The GMLC also provides authentication and authorization for positioning requests, protects the privacy of the location data of mobile terminals, generates billing information for location-based services and handles the distribution of location enabled information requested by mobile terminals.

When a mobile terminal is activated in an area served by access point 20, a Bluetooth link is established. An IP based connection is formed between the access point 20 and access controller 24. As described above, through a link between the access controller 24 and an appropriate MSC, the mobile terminal connected to the access point 20 can receive GSM functions and services from the network core 12. However, if the user of mobile terminal 1 wishes to make use of location based services (or the location of the mobile terminal 1 is required for any other reason), because the mobile terminal 1 is not connected to the network core 12 in the conventional manner (via BTS 22 and BSC 26), many of the conventional methods of determining the location of the mobile terminal may not be available.

Figure 3:
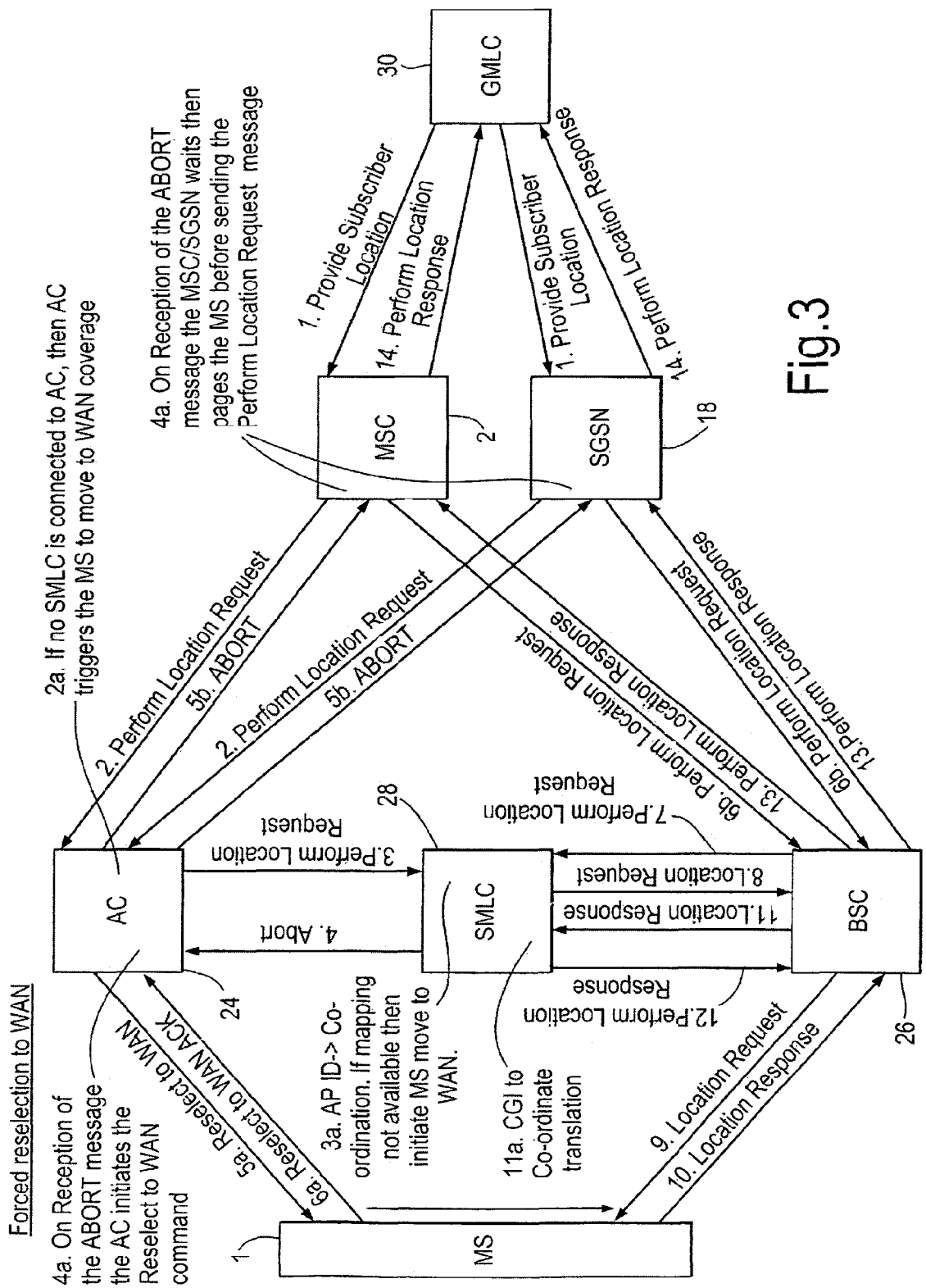
FIG. 3 shows the messages transmitted between elements of the modified mobile telephone network to determine to location of a mobile device.
Figure 4A:
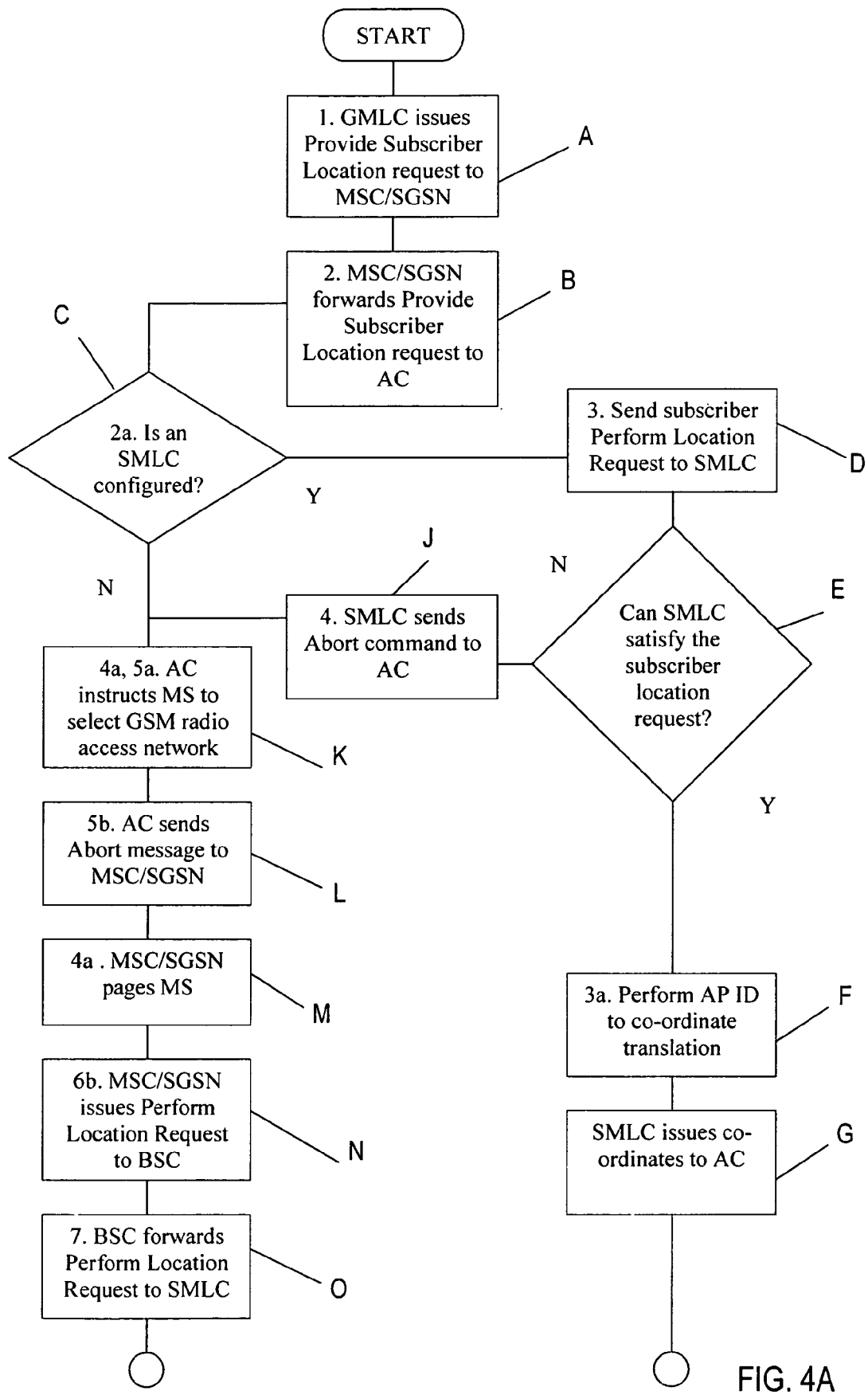
FIGS. 4A and 4B show a flow chart, illustrating the steps performed to determine the location of a mobile device.
Figure 4B:
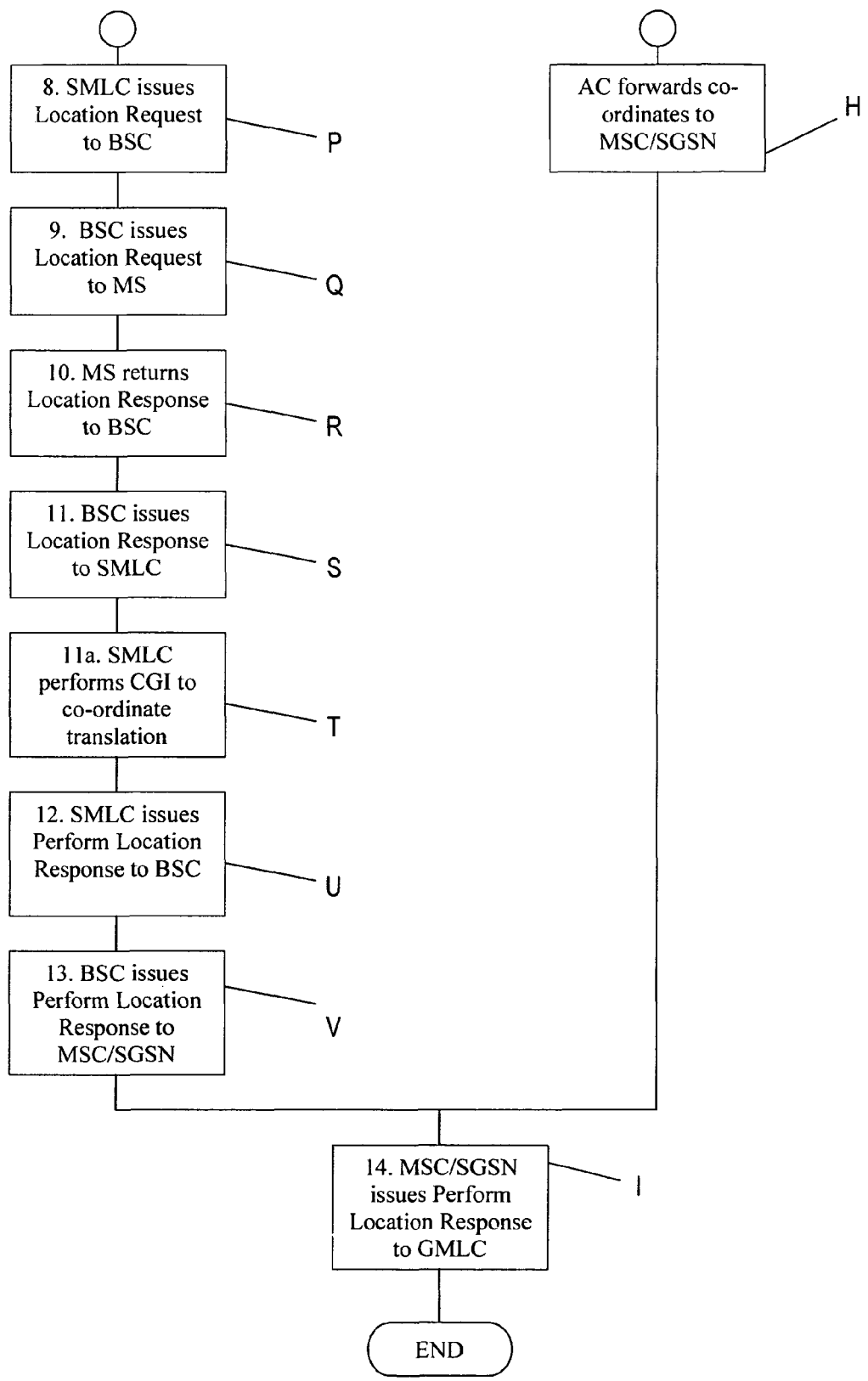

FIG. 3 shows the messages transmitted between the elements of the network shown in FIG. 2 when a request for location information is made when a mobile terminal is connected to the network core via AP20 and AC24, and FIGS. 4A and 4B show a flow chart of the steps performed. Some of the messages transmitted each have a reference number, and where a step of the flow chart corresponds to the transmission of a message, the description of the relevant step of the flow chart is preceded by the reference numeral for the message.

At step A GMLC 30 issues a "Provide Subscriber Location" message (1.), which is a request for the geographical location of the mobile terminal 1. This message is transmitted to either the MSC 2 or the SGSN 18, in dependence upon whether the mobile terminal is connected to the network core in the circuit switched or packet switched domain. The relevant MSC 2 or SGSN 18 to which the message should be sent is determined by the GMLC 30 consulting the records in the HLR 10. The MSC/SGSN will then determine that the mobile terminal is connected to the network by access controller 24, and will forward the "Perform Location Request" message (2.) to the access controller 24 (step B).

The SMLC 28 differs from a conventional GSM SMLC in that it also maintains the database of the geographical location (for example, latitude and longitude) of the access points that it serves. The SMLC maintains a table of geographic location data against each access point ID.

At step C the access controller 24 determines whether it is able to potentially provide location information for the mobile terminal 1. In this example, the access controller 24 determines whether there is an SMLC 28 configured to provide data thereto.

If, at step C, it is determined that the access controller 24 has an SMLC 28 configured to potentially provide location data thereto then, at step D, the access controller 24 transmits a "Perform Location Request" message (3.) to the SMLC 28. The access point 20 to which the mobile terminal 1 is connected is recorded at the access controller 24, and this information is passed to the SMLC 28 as part of the "Perform Location Request" message (3.). At step E the SMLC 28 determines whether it can indeed provide location information for the mobile terminal 1.

If it is determined at step E that the SMLC can satisfy the subscriber location request then, at step F, the SMLC 28 interrogates its table of access point IDs and geographical location data to retrieve the geographic coordinates of the access point to which the mobile terminal 1 is connected. In this regard, it should be noted that the SMLC is an example of a structural implementation of a means for interrogating a location data processor to obtain data indicative of the location of a device, however, any other devices and/or systems of comparable functionality may alternatively be employed.

At Step G the SMLC 28 issues the location coordinates obtained from its table for the relevant access point ID and returns these to the access controller 24. At step H the access controller 24 forwards these location coordinates to the MSC/SGSN from which the original location request was issued. At step I the relevant MSC/SGSN issues a "Perform Location Response" message (14.) to the GMLC 30, which includes the geographic coordinates. The GMLC 30 can then provide this data to the relevant element which initially sought the location of the mobile terminal 1.

However, if the SMLC 28 cannot provide the required location data in the manner discussed in relation to steps F,G and H—because it is determined at step C that no SMLC is configured, or at step E that the SMLC 28 cannot satisfy the location request (in which case the SMLC 28 sends an "Abort" message (4.) to the access controller 24 (step J))—the access controller 24 then instructs the mobile terminal 1 to select the GSM radio access network via the appropriate BTS 22 and BSC 26 (step K). It should be noted here that the access controller is one exemplary structural implementation of a means for causing a device to switch between the respective access networks if location indicative data is not available when the device uses one of those access networks.

The access controller 24 then sends an "Abort" message (5b.) to the relevant MSC/SGSN at step L. At step M the MSC/SGSN awaits for the mobile terminal 1 to re-select to the GSM radio access network and pages the mobile terminal 1 to identify with which BTS 22 it is connected. When this information is received, the MSC/SGSN then issues a "Perform Location Request" message (6b.) to the relevant BSC 26—step N. The BSC 26 forwards the "Perform Location Request" message (7.) to the SMLC 28—step O.

The SMLC 28 determines the mechanism to best achieve the location request and may issue a "Location Request" message (8.) to the BSC 26—step P. The "Location Request" message (8.) is mainly to provide information to the mobile terminal to obtain its own relative location. The BSC 26 then (depending on the procedure that the SMLC has determined as most suitable to achieve the location request) transmits the "Location Request" message (9.) to the mobile terminal 1—step Q. The mobile terminal 1 returns a "Location Response" message (10.) to the BSC—step R. This message should return the relative location of the mobile terminal from this information the SMLC should be able to calculate the geographic information of the mobile terminal.

At step S the BSC forwards the "Location Response" message (11.) to the SMLC 28. At step T the SMLC 28 analyses the content of the received message, which includes the CGI of the mobile terminal 1, and uses one of the known mechanisms described above to determine the geographical location/coordinates of the mobile terminal 1. The calculated geographic coordinates are then returned by the SMLC 28 to the BSC 26 in a "Perform Location Response" message (12.)—step U.

The BSC 26 then forwards the "Perform Location Response" message (13.) to the relevant MSC/SGSN. The next step is step I, at which the MSC/SGSN transmits the "Perform Location Response" message (14.) to the GMLC 30, which then makes use of this information in the manner already described above in relation to step I.

If desired, the mobile terminal may now reconnect to the network core via the access point 20 and access controller 24. This may be triggered automatically in response to the obtaining of location information in steps H to V, or may occur automatically when the mobile terminal 1, when using the GSM radio access network, detects that the access point 20 is available, and reconnects to the access point 20. Further alternatively, the user of the mobile terminal 1 may manually select that communications are routed via the access point 20.

Additionally or alternatively to the location determining methods described above, the SMLC 28 may be able to initiate GPS positioning of the mobile terminal to obtain location information.

The term "GSM" used in this specification should be interpreted broadly. The invention is applicable to other telecommunications networks that are similar to GSM networks (in that they have equivalent nodes with equivalent functionality)—such as UMTS (3G), AMPS, D-AMPS, DCS 1800, IS-41, IS-54, IS-95, PCS, CDMA, TDMA networks. The invention is also applicable to developments or extensions to GSM—such as GPRS.

What is claimed is:

1. A telecommunications network, comprising:
   a radio access network comprising a plurality of geographically distributed cells;
   a core network adapted to provide telecommunications network functions to devices registered therewith,
   wherein the core network is adapted to provide the telecommunications network functions to said devices via the radio access network or via a second access network,
   the telecommunications network further comprising:
   means for determining if the device is connected to the core network using the second access network or the radio access network;
   means for receiving a request for the location of a device included in said devices;
   interrogating means for determining whether a location data processor can provide data indicative of the location of said device, the data indicative of location being determined by whether the device is connected by the second access network or the radio access network, the interrogating means being configured to maintain a table of geographic location data for each access point to which the interrogating means is connected; and
   means for causing the device to switch from a first one to a second one of the respective radio and second access networks if said location indicative data is determined not to be available when the device uses the first one of the respective radio and second access networks,
   wherein a relative location of the device is returned to the interrogating means via the second access network, the interrogating means being further configured to determine the geographical coordinates of the device using the relative location and the stored geographic location data, and
   wherein said device is reconnected to the first one of the respective radio and second access networks after the location indicative data is determined.

2. The telecommunications network of claim 1, wherein the radio access network comprises a plurality of base stations, each of which serves one of said cells, and the core network comprises a plurality of switching centers, each of said switching centers controlling a plurality of said base stations.

3. The telecommunications network of claim 2, wherein said switching centers comprise GSM Mobile Switching Centers.

4. The telecommunications network of claim 2, wherein said switching centers comprise one of: GSM Serving Gateway Support Nodes; or, UMTS Serving Gateway Support Nodes.

5. The telecommunications network of claim 1, wherein said another access network includes a plurality of access points.

6. The telecommunications network of claim 5, wherein the core network is adapted to provide the telecommunications network functions to said devices over a non-cellular telecommunications network bearer, the non-cellular telecommunications network bearer including a wireless link between the device and at least one of the plurality of access points.

7. The telecommunications network of claim 6, wherein said wireless link comprises one of: a Bluetooth link; or, WLAN link.

8. The telecommunications network of claim 6, wherein said wireless link comprises a link using unlicensed spectra.

9. The telecommunications network of claim 1, wherein said core network is adapted to provide the telecommunications network functions to said devices over a non-cellular telecommunications network bearer, the non-cellular telecommunications network bearer comprising an IP-based communications link.

10. The telecommunications network of claim 9, wherein said IP-based communications link includes the Internet.

11. The telecommunications network of claim 1, wherein said another access network includes an access controller coupled to access points with which said devices are communicatively coupled.

12. The telecommunications network of claim 11, wherein said access controller provides to the location data processor data indicative of the access points with which said devices are communicatively coupled.

13. The telecommunications network of claim 12, wherein the location data processor is operative to provide data indicative of the location of at least some of said access points to which said devices are communicatively coupled by said another access network in order to provide said data indicative of the location of said device.

14. The telecommunications network of claim 1, wherein the location data processor is operative to provide said data indicative of the location of said device by using data received from said device.

15. The telecommunications network of claim 1, wherein the location data processor is operative to provide said data indicative of the location of said device by using data received from said radio access network.

16. The telecommunications network of claim 15, wherein said data indicative of the location of said device from said radio access network includes at least one of cell identity information, timing data, signal strength data, triangulation data and GPS data.

17. The telecommunications network of claim 15 wherein said location indicative data includes a database of geographical locations of the access points.

18. The telecommunications network of claim 1, wherein the location data processor includes a Serving Mobile Location Centre (SMLC).

19. The telecommunications network of claim 1, wherein the telecommunications network is a GSM network.

20. The telecommunications network of claim 1, wherein the telecommunications network is a 3G (UMTS) network.

21. The telecommunications network of claim 1, wherein the means for causing the device to switch from a first one to a second one of the respective access networks also causes the device to switch from the second one to the first one of the respective access networks if said location indicative data is determined not to be available when the device uses the second access network.

22. A method of operating a telecommunications network including a radio access network and a core network for providing telecommunications network functions to devices registered therewith, the radio access network comprising a plurality of geographically distributed cells, and the core network being adapted to provide the telecommunications network functions to said devices via a second access network or the radio access network, the method including:
  determining if the device is connected to the core network using the second access network or the radio access network;
  receiving a request for the location of a device included in said devices;
  determining whether a location data processor can provide data indicative of the location of said device, the data indicative of location being determined by whether the device is connected by the second access network or the radio access network, wherein a table of geographic location data is maintained for each access point; and
  selectively causing the device to switch from a first one to a second one of the respective radio and second access networks if said location indicative data is determined not to be available when the device is coupled to the first one of the respective radio and second access networks,
  wherein a relative location of the device is returned via the second access network, and wherein the geographical coordinates of the device are determined using both the relative location and the stored geographic location data, and
  wherein said device is reconnected to the first one of the respective radio and second access networks after the location indicative data is determined.

23. The method of claim 22, wherein the radio access network comprises a plurality of base stations, each of which serves one of said cells, and the core network comprises a plurality of switching centers, each of said switching centers controlling a plurality of said base stations.

24. The method of claim 23, wherein said switching centers comprise GSM Mobile Switching Centers.

25. The method of claim 23, wherein said switching centers comprise one of: GSM Serving Gateway Support Nodes; or, UMTS Serving Gateway Support Nodes.

26. The method of claim 22, wherein said another access network includes a plurality of access points.

27. The method of claim 26, wherein the core network is adapted to provide the telecommunications network functions to said devices over a non-cellular telecommunications network bearer, the non-cellular telecommunications network bearer including a wireless link between the device and at least one of the plurality of access points.

28. The method of claim 27, wherein said wireless link comprises one of: a Bluetooth link; or, WLAN.

29. The method of claim 27, wherein said wireless link comprises a link using unlicensed spectra.

30. The method of claim 22, wherein said core network is adapted to provide the telecommunications network functions to said devices over a non-cellular telecommunications network bearer, the non-cellular telecommunications network bearer comprising an IP-based communications link.

31. The method of claim 30, wherein said IP-based communications link includes the Internet.

32. The network of claim 22, wherein said another access network includes an access controller coupled to access points with which said devices are communicatively coupled.

33. The method of claim 22, wherein said access controller provides to the location data processor data indicative of the access points with which said devices are communicatively coupled.

34. The method of claim 33, wherein said location data processor provides data indicative of the location of at least some of the access points with which said devices communicate to provide said data indicative of the location of said device.

35. The network of claim 22, wherein the location data processor provides said data indicative of the location of a said device by using data received from said device.

36. The method of claim 22, wherein the location data processor provides said data indicative of the location of said mobile terminal using data received from said radio access network.

37. The method of claim 36, wherein said data indicative of the location of said device from said radio access network includes at least one of: cell identity information; timing data; signal strength data; triangulation data; and, GPS data.

38. The method of claim 22, wherein the location data processor is part of a Serving Mobile Location Centre (SMLC).

39. The method of claim 22, wherein the telecommunications network is a GSM network.

40. The method of claim 22, the method further including:
   selectively causing the device to switch from the second one to the first one of the respective access networks if said location indicative data is determined not to be available when the device is coupled to the second access network.

* * * * *